United States Patent [19]
Yumoto

[11] Patent Number: 5,405,078
[45] Date of Patent: Apr. 11, 1995

[54] THERMALLY-ACTUATED STEAM TRAP

[75] Inventor: Hideaki Yumoto, Kakogawa, Japan

[73] Assignee: TLV Co. Ltd., Kakogawa, Japan

[21] Appl. No.: 236,789

[22] Filed: Apr. 29, 1994

[30] Foreign Application Priority Data

May 14, 1993 [JP] Japan .................. 5-136440

[51] Int. Cl.⁶ .............................................. F16T 1/10
[52] U.S. Cl. .................. 236/58; 236/93 A; 374/203
[58] Field of Search ............... 236/56, 58, 93 A, 99 J; 374/201, 203

[56] References Cited

U.S. PATENT DOCUMENTS

| | | | |
|---|---|---|---|
| 1,109,705 | 9/1914 | Serrell et al. | 236/58 |
| 1,628,430 | 5/1927 | Ribes | 236/58 |
| 1,808,556 | 6/1931 | Jones | 236/56 X |
| 1,832,291 | 11/1931 | Fitts | 236/56 X |
| 1,886,500 | 11/1932 | Schmidt | 236/58 |
| 3,534,611 | 10/1970 | Hilgert | 374/201 X |
| 4,013,220 | 3/1977 | Zoller | 236/56 |
| 4,248,376 | 2/1981 | Foller | 236/58 |
| 4,295,605 | 10/1981 | Clayton et al. | 236/56 |
| 4,681,256 | 7/1987 | Dewhirst | 236/56 |
| 4,792,090 | 12/1988 | Dewhirst | 236/56 |
| 4,955,536 | 9/1990 | Foller et al. | 236/48 R |

FOREIGN PATENT DOCUMENTS 0012267 6/1980 European Pat. Off. .
2630038 1/1978 Germany .

Primary Examiner—William E. Tapolcai
Attorney, Agent, or Firm—Jordan and Hamburg

[57] ABSTRACT

A thermally-actuated steam trap, which performs the opening and closing operations of a valve according to a change in the volume of an expansible medium, comprises at least two diaphragms and a valve member fitted to the lower diaphragm. The lower diaphragm is shaped so that it comes to be more sensitive to a change in pressure than the upper diaphragm, to provide a steam trap which permits a discharge passage to be opened also when the fluid pressure at the inlet side is relatively week, and which is stable in operation from the initial stage as the opening and closing operations of the valve are performed intermittently.

5 Claims, 2 Drawing Sheets

THERMALLY-ACTUATED STEAM TRAP

BACKGROUND OF THE INVENTION

The present invention relates to a steam trap for automatically discharging condensate generated in various kinds of steam using equipment and steam pipe lines, and, more particularly, to a thermally-actuated steam trap adapted to discharge the condensate below a desired temperature out of a system by using a temperature control element including a medium which is heated and expanded by steam and cooled and contracted by condensate.

Such a thermally-actuated steam trap is provided with a body having therein a valve chest in which steam or condensate is introduced and a temperature control element disposed in the valve chest. The temperature control element used for such a steam trap comprises two disk-like wall members, an upper one and a lower one, and at least one diaphragm provided between the two wall members, the diaphragm being secured at its outer peripheral edge to both the wall members, and the inner space formed between the upper wall member and diaphragm accomodating an expansible medium which changes in volume corresponding to the temperature. Further, on the diaphragm at the side opposite the expansible medium side is carried a valve member.

In such a steam trap, since the diaphragm member and the valve member are displaced to perform the opening and closing operations of the valve part, the diaphragm member composed of a particularly thin member is often damaged and the steam trap comes not to fulfill its function; so, it has hitherto been widely performed to constitute the diaphragm member with a plurality of diaphragm sheets for its reinforcement, as shown in DE 26 30 038 B1. U.S. Pat. No. 4,955,536 also shows a plurality of diaphragms in its drawings without depending upon their relation to the technical contents proposed therein. Further, there are also known steam traps provided with a plurality of diaphragms in such a state as shown in U.S. Pat. No. 4,013,220 and EP-A-0012267.

Moreover, the inventor of the present application filed a thermally-actuated steam trap, which permits condensate to also be discharged when the diaphragm member is damaged, as in U.S. Pat. application Ser. No. 07/851,388, European Pat. Application No. 92104066.3, Canadian Pat. Application No. 2,062,930-1, Australian Pat. Application No. 12182/92, and South African Pat. Application No. 92/1879, and took out patents for the invention (U.S. Pat. No. 5,191,669, Australia Pat. No. 638184 and South African Pat. No. 92/1879). This invention comprises a temperature control element in which an expansible medium is sealed in an accommodating chamber between an upper wall member and a first diaphragm, a valve member is connected to a second diaphragm member, and the second diaphragm and the valve member are each formed with a through-hole.

In the thermally-actuated steam trap provided with the plurality of diaphragms as described above, an inflow of steam at a high temperature into the valve chest causes the expansible medium to expand, thereby displacing each diaphragm in the direction of closing the valve, so that the valve member carried by the lower diaphragm (second diaphragm) or the diaphragm per se is brought into a seating engagement with the valve seat member and, accordingly, the discharge passage formed on the valve seat member is closed. This prevents the discharge of steam. On the other hand, an inflow of condensate at a low temperature in the valve chest causes the expansible medium to contract, thereby displacing each diaphragm in the direction of opening the valve, so that the valve member or the diaphragm per se is brought out of a seating engagement with the valve seat member to open the discharge passage, thereby discharging the condensate out of the system.

However, the thermally-actuated steam trap as constructed above has a problem in that, in the case where the fluid at the inlet side has no sufficient pressure, the discharge passage can not be opened. Namely, when the expansible medium contracts, the chamber in which the expansible medium is accommodated comes to be in a state of negative pressure, so that the upper diaphragm (first diaphragm) is displaced in the direction of opening the valve; however, with the fluid at the inlet side being weak in pressure, the lower diaphragm, particularly fitted with the valve member, can not follow the upper diaphragm, that is, it can not be displaced in the direction of opening the valve, and accordingly, the valve member is not brought out of a seating engagement with the valve seat member, so the discharge opening can not be opened. For example, in a steam-using equipment or the like, the pressure and temperature in the system are low at an initial stage of transferring steam, and the upper diaphragm is displaced in the direction of opening the valve; however, the lower diaphragm remains in the position of closing the valve and, therefore, condensate can not rapidly be discharged and a considerable amount of condensate accumulates in the steam trap, resulting in a lowered machine efficiency.

Moreover, in the thermally-actuated steam trap provided with the plurality of diaphragms, the construction in which the plurality of diaphragms are connected to the valve member so as to be able to be integrally moved therewith or the construction in which the lower diaphragm is combined with the function of the valve member causes the diaphragm to be fractionally displaced due to a change in temperature, in the case where the expansible medium has a temperature close to the temperature at which the opening and closing operations of the valve are switched, so that the opening and closing operations of the valve are finely repeated as if it were vibrated, thus having the danger of such operations being mistaken for a leakage of steam. Further, such fractional displacements cause the earlier abrasion of the valve part, resulting in a leakage of steam.

SUMMARY OF THE INVENTION

It is, therefore, an object of the invention to provide a steam trap which allows the discharge passage to be opened even if the fluid at the inlet side is relatively weak in pressure, and which is stable in operation from the initial stage.

It is a further object of the invention to provide a steam trap in which the opening and closing operations of the valve are performed intermittently in order to prevent the mistake of a leakage of steam and the earlier abrasion of the valve part.

In order to achieve both of the above-mentioned objects, according to the invention, a thermally-actuated steam trap comprises:

a valve casing having an inlet, a valve chest and an outlet;

a valve seat member disposed between the valve chest and the outlet and having an discharge passage;

a temperature control element disposed within the valve chest, said temperature control element including two disk-like wall members, an upper one and a lower one, at least two diaphragms, an upper one and a lower one, secured at their circumferential edges between said wall members, and an expansible medium sealed between the upper wall member and the upper diaphragm, a valve member being fitted to the lower diaphragm, said lower diaphragm being shaped so that it becomes more sensitive to a change in pressure than the upper diaphragm.

The second object is more surely achieved by curving the upper diaphragm convexly toward said expansible medium side to provide it with the function of a leaf spring which resists a change in the volume of said expansible medium.

Preferably, at least the lower diaphragm is shaped with ripples so that the contact between the two diaphragms comes to be lines of contact or points of contact due to the difference in the shape of the upper and lower diaphragms.

The lower diaphragm may be formed to be thinner than the upper diaphragm.

Preferably, the lower diaphragm is formed by a material more elastic than the upper diaphragm.

BRIEF DESCRIPTION OF THE DRAWINGS

The above and other objects and features of the invention will become more apparent upon reading the following description and drawings, in which.

DETAILED DESCRIPTION OF PREFERRED EMBODIMENT

The present invention will now be explained by way of an embodiment.

Figure 1:
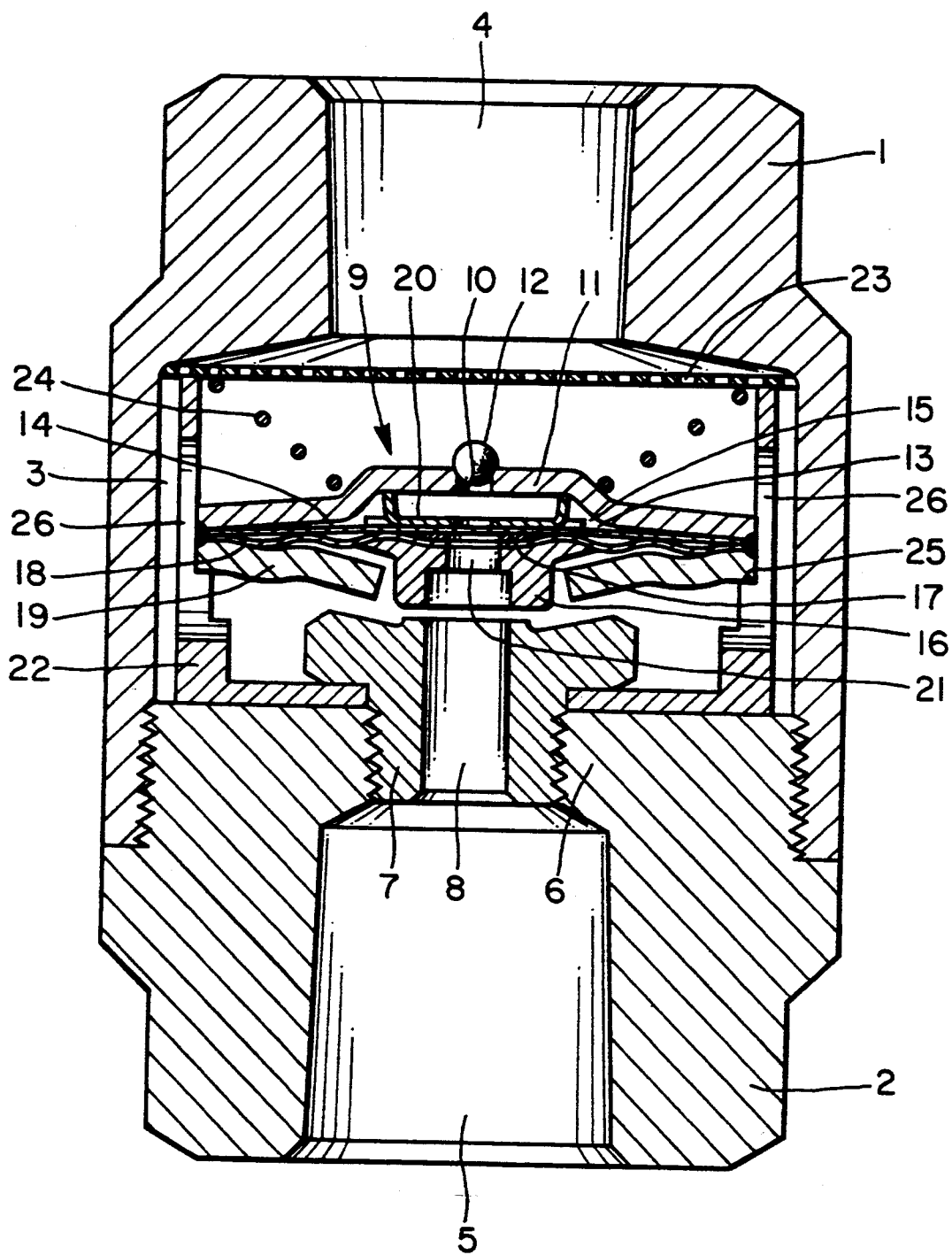
FIG. 1 is a sectional view of a thermally-actuated steam trap of an embodiment according to the invention, showing a situation of the valve being opened.
Figure 2:
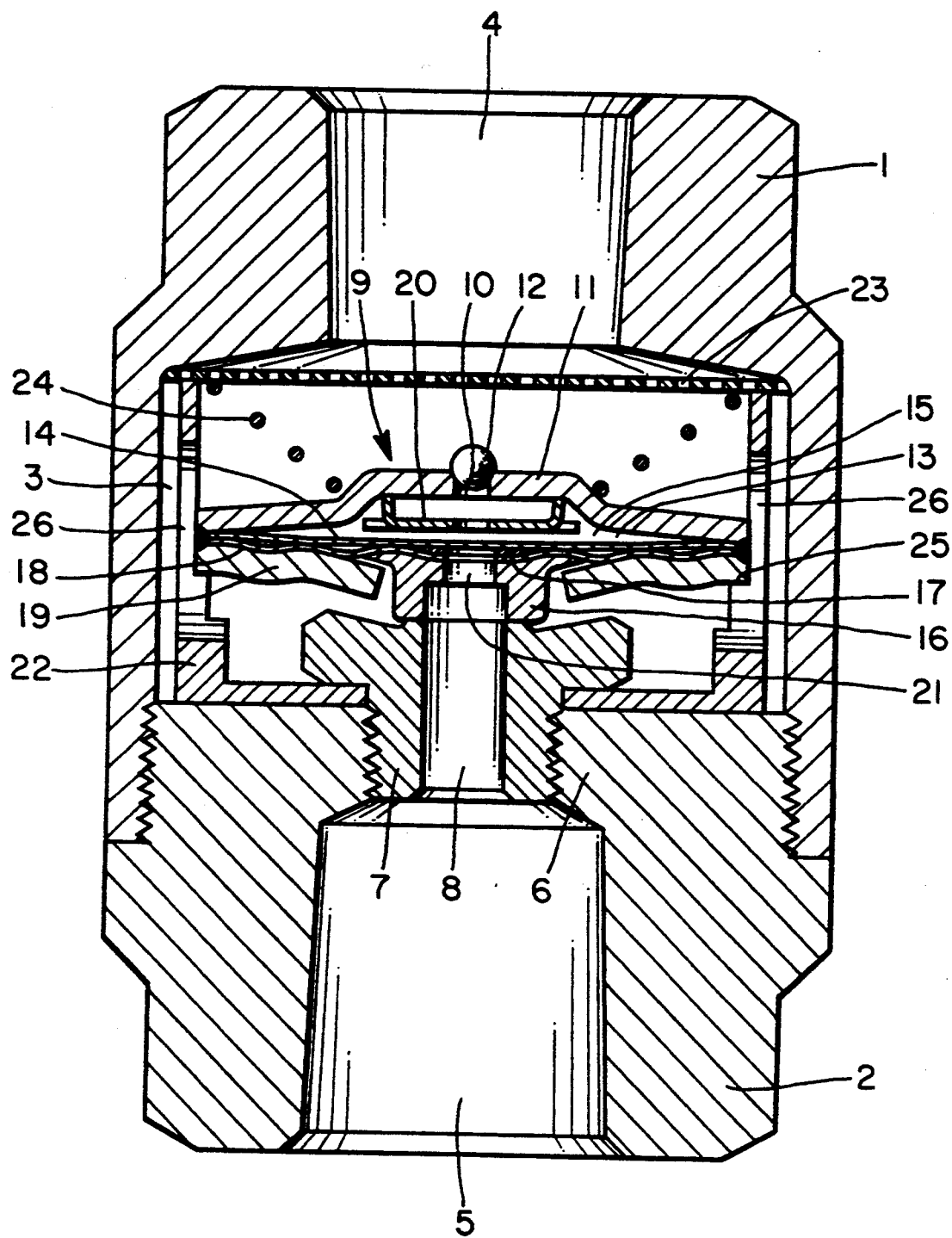
FIG. 2 is a sectional view of the steam trap corresponding to FIG. 1, showing a situation of the valve being closed.

Referring to FIG. 1, an upper casing 1 and a lower casing 2 are threadably connected with each other to form a valve casing having a valve chest 3 therein. The upper casing 1 and the lower casing 2 are formed with an inlet 4 and an outlet 5, respectively.

To a partition wall 6 between the valve chest 3 and the outlet 5 is threadably connected a valve seat member 7. In the middle of the valve seat member 7 is provided a penetrating discharge passage 8 communicating the valve chest 3 with the outlet 5.

A temperature control element 9 is accomodated within an fitting member 24 in the form of a bottomed cylinder held at the inner periphery of the bottom thereof between the partition wall 6 and the valve seat member 7, so that the temperature control element 9 is positioned upwardly of the valve seat member 7. On the peripheral wall of the fitting member 24 are provided a plurality of windows 28 for allowing condensate to flow. The temperature control element 9 comprises an upper wall member 11, a first diaphragm 14, an expansible medium 15, a valve member 16, a second diaphragm 18 held between the valve member 16 and a separate annular member 17, and a lower wall member 19 provided with a center hole in which the valve member 16 can enter. The valve member 16, annular member 17 and second diaphragm 18 are each formed with a through hole 21, which communicates between the lower surface of the first diaphragm 14 and the discharge passage 8.

The expansible medium 15 is poured from a pouring port 10 of the upper wall member 11 into the accomodating chamber 13 formed by the upper wall member 11 and the first diaphragm 14, and the pouring port 10 is covered and sealed with a plug member 12. The expansible member 15 consists of water, liquid having a boiling point lower than water or a mixture thereof.

The valve member 16 comes into and out of a seating engagement with the valve seat member 7 to open and close the discharge passage 8. The outer peripheral walls of both the first diaphragm 14 and second diaphragm 18 are sandwiched between the upper wall member 11 and lower wall member 19 and secured thereto. In the middle region of the lower surface of the upper wall member 11 is secured a stopper 20 which serves to limit the displacement of the diaphragms 14 and 18 due to contraction of the expansible medium 15.

As can be understood from FIG. 1, the first diaphragm 14 is shaped to be curved in a upwardly convex manner. On the other hand, the second diaphragm 18 is shaped with a plurality of concentric ripples. The ripple of the second diaphragm is shaped by taking into consideration a reduction in the resistance of displacement of the diaphragm integrally formed with the valve member 16. In the case where the leaf spring function of the first diaphragm 14 shaped in a curve is greater than a predetermined function due to its thickness or the like, the first diaphragm 14 may also be formed with ripples to balance the strength, the leaf spring function and the property of displacement. Generally, the first diaphragm is formed with ripples smaller than the ripples of the second diaphragm. These diaphragms may each be composed of a plurality of sheets.

The first and second diaphragms are different in their configurations so that both the diaphragms come into only lines of contact with each other, thereby surely avoiding that they are stock to each other and moved integrally.

The surface of the lower wall member 19, with which the lower surface of the second diaphragm comes into an abutting engagement, is curved so that it substantially coincides with the wave form of the second diaphragm when the valve member 16 comes into a seating engagement with the valve seat member 7.

Between a filter screen 23, which is held between the upper casing 1 and the fitting member 22, and the upper wall member 11 of the temperature control member 9 is disposed a conical coil spring 24 which biases the temperature control element 9 downward, so that the lower surface of the lower wall member 19 is brought into pressure contact with the stepped portion 25 formed on the inner surface of the fitting member 22.

In operation, in the case where the fluid which flows from the inlet 4 into the valve chest 3 is condensate at a low temperature, the expansible medium 15 contracts, as shown in FIG. 1, so that the first diaphragm 14 is displaced upwardly, and the second diaphragm 18 is lifted due to the pressure of the fluid within the valve chest 3. The upward displacement of the second diaphragm causes the valve member 16 to be brought out of a seating engagement with the valve seat member 7, thereby opening the discharge passage 8. Thus, condensate is discharged from the outlet 5.

The second diaphragm 18, which is fitted with the valve member 16, is formed in a shape easy to be displaced due to the action of pressure, taking the total weight of the valve member and second diaphragm into consideration, and therefore, the motion of opening the valve comes to be smooth even in the early operation when the pressure of the fluid at the inlet side is relatively weak.

When the temperature within the valve chest 3 rises due to steam at a high temperature after the condensate which is the fluid at a low temperature is discharged, the expansible medium 15 expands, so that the first and second diaphragms 14 and 18 are displaced downwardly, and accordingly, the valve member 16 is brought into a seating engagement with the valve seat member 7, thereby closing the discharge passage 8 to prevent the outflow of steam.

When the valve member 16 comes into a seating engagement with the valve seat member 7, there is a slight clearance between the lower surface of the second diaphragm 18 and the upper surface of the lower wall member 19; however, when the expansible medium 15 further expands (a state of overheating), the temperature control element 9 is displaced upwardly within the fitting member 22 against the biasing force of the coil spring 24, so that the lower surface of the second diaphragm 18 and the upper surface of the lower wall member 19 are substantially brought into close contact with each other.

In the above-mentioned embodiment, the configuration of the upwardly convex curve is given to the first diaphragm to provide the function of resistance against a change in the volume of the expansible medium, and, at the same time, the difference in shape is given to the upper and lower diaphragms, so that both (i) the smoothly opening of the discharge passage in the state of a weak pressure at the inlet side and (ii) the intermittent opening and closing operations of the valve, which are contrary to each other at a glance, are realized; however, alternatively, both the diaphragms may be different in thickness from each other. Namely, the configuration of the upwardly convex curve is given to both the diaphragms to provide resistances against a change in the volume of the expansible medium, and at the same time, the second diaphragm is made thinner, in order to solve the problem of the operation of opening the valve at the time of a weak pressure.

Alternatively, the materials of both diaphragms may be different. For example, the first diaphragm may be composed of stainless steel, or of nickel molybdenum alloy, nickel chrome molybdenum alloy or nickel chrome molybdenum-iron alloy, these three alloys being typical of Hastelloy (name of article), and the second diaphragm may be composed of phosphor bronze or heat resisting rubber. Further, also in the case where the same stainless steels are used for both diaphragms, the amounts of contained carbon may be changed or stainless steels with different chemical components may be used.

What is claimed is:

1. A thermally-actuated steam trap comprising:
   a valve casing having an inlet, a valve chest and an outlet;
   a valve seat member disposed between said valve chest and said outlet and having an discharge passage;
   a temperature control element disposed within said valve chest,
   said temperature control element including
      two disk-like wall members, an upper one and a lower one,
      at least two diaphragms, an upper one and a lower one, secured at their circumferential edges between said wall members, and
      an expansible medium sealed between said upper wall member and said upper diaphragm,
      a valve member being fitted to said lower diaphragm;
      said lower diaphragm being shaped so that it becomes more sensitive to a change in pressure than said upper diaphragm.

2. A thermally-actuated steam trap as claimed in claim 1, wherein said upper diaphragm is further curved convexly toward said expansible medium side to provide it with the function of a leaf spring which resists a change in the volume of said expansible medium.

3. A thermally-actuated steam trap as claimed in claim 1, wherein at least said lower diaphragm is shaped with ripples so that the contact between said two diaphragms comes to be lines of contact or points of contact due to the difference in shape of said upper and lower diaphragms.

4. A thermally-actuated steam trap as claimed in claim 1, wherein said lower diaphragm is formed to be thinner than said upper diaphragm.

5. A thermally-actuated steam trap as claimed in claim 1, wherein said lower diaphragm is formed by a material more elastic than said upper diaphragm.

* * * * *